(12) United States Patent
Ferreira et al.

(10) Patent No.: US 12,371,192 B2
(45) Date of Patent: Jul. 29, 2025

(54) METHOD FOR MOUNTING A VORTEX GENERATOR ON A CURVED AERODYNAMIC PANEL OF AN AIRCRAFT AND AIRCRAFT COMPRISING AT LEAST ONE VORTEX GENERATOR MOUNTED IN THIS WAY

(71) Applicant: Airbus Operations SAS, Toulouse (FR)

(72) Inventors: Julien Ferreira, Toulouse (FR); Rémy Weill, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 9 days.

(21) Appl. No.: 18/480,785

(22) Filed: Oct. 4, 2023

(65) Prior Publication Data
US 2024/0124158 A1 Apr. 18, 2024

(30) Foreign Application Priority Data

Oct. 12, 2022 (FR) ...................................... 2210449

(51) Int. Cl.
*B64F 5/10* (2017.01)
*B64C 5/08* (2006.01)
(Continued)

(52) U.S. Cl.
CPC ................. *B64F 5/10* (2017.01); *B64C 7/02* (2013.01); *B64C 23/06* (2013.01); *B64C 5/08* (2013.01)

(58) Field of Classification Search
CPC ........... B64C 23/06; B64C 7/02; B64D 29/00; F42B 10/04; F42B 10/06; B63B 32/66
See application file for complete search history.

(56) References Cited

U.S. PATENT DOCUMENTS

| | | | |
|---|---|---|---|
| 5,807,152 A * | 9/1998 | Wojcik | B63B 32/66 441/74 |
| 2019/0367160 A1 | 12/2019 | Krier et al. | |
| 2019/0367175 A1 | 12/2019 | Krier et al. | |

FOREIGN PATENT DOCUMENTS

| | | |
|---|---|---|
| EP | 3575208 A1 | 12/2019 |
| EP | 3575209 A1 | 12/2019 |

(Continued)

OTHER PUBLICATIONS

Alton, Homemade FCS Weed Fins for Surfboard, Oct. 23, 2016, Weather Talk for BC, accessed at [https://wtfbc.ca/viewtopic.php?p=23630] (Year: 2016).*

(Continued)

*Primary Examiner* — Timothy D Collins
*Assistant Examiner* — Justin Michael Heston
(74) *Attorney, Agent, or Firm* — Greer, Burns & Crain, Ltd.

(57) ABSTRACT

A method for mounting a vortex generator on an aerodynamic panel of an aircraft, including, before the step of assembling the vortex generator and the aerodynamic panel, a step of installing at least one shim interposed between the base of the vortex generator and the aerodynamic panel, the shim including a first face, oriented towards the aerodynamic panel during operation, that is shaped like the inner surface of the aerodynamic panel, and a second face, oriented towards the base during operation, that is shaped like the upper face of the arm of the base. This solution makes it possible to manufacture the vortex generator without taking into account the curvature of the aerodynamic panel. An aircraft is provided including at least one vortex generator mounted in this way.

11 Claims, 3 Drawing Sheets

(51) Int. Cl.
    *B64C 7/02*           (2006.01)
    *B64C 23/06*        (2006.01)

(56) References Cited

FOREIGN PATENT DOCUMENTS

| | | |
|---|---|---|
| FR | 3081830 A1 | 12/2016 |
| FR | 3099460 A1 | 2/2021 |

OTHER PUBLICATIONS

French Search Report for corresponding French Patent Application No. 2210449 dated Mar. 21, 2023; priority document.

\* cited by examiner

METHOD FOR MOUNTING A VORTEX GENERATOR ON A CURVED AERODYNAMIC PANEL OF AN AIRCRAFT AND AIRCRAFT COMPRISING AT LEAST ONE VORTEX GENERATOR MOUNTED IN THIS WAY

CROSS-REFERENCES TO RELATED APPLICATIONS

This application claims the benefit of the French patent application No. 2210449 filed on Oct. 12, 2022, the entire disclosures of which are incorporated herein by way of reference.

FIELD OF THE INVENTION

The present application relates to a method for mounting a vortex generator on a curved aerodynamic panel of an aircraft and to an aircraft comprising at least one vortex generator mounted in this way.

BACKGROUND OF THE INVENTION

As illustrated in FIGS. 1 and 2, an aircraft 10 comprises a plurality of powerplants 12 that each have a nacelle 14 surrounding a propulsion system. The nacelle 14 comprises at least one aerodynamic panel 16, such as a cowl for example, provided with at least one vortex generator 18, also known as an aileron or strake.

The vortex generators 18, positioned on either side of the pylon on the cowl of the nacelle, make it possible improve aerodynamic performance, in particular by delaying the separation of the air stream from the upper surface of the wing and by increasing lift during landing phases.

According to a first embodiment, a vortex generator has a T-shaped transverse cross-section and comprises an active portion (corresponding to the upright of the T) and a base (corresponding to the crossbar of the T) pressed against the outer surface of the aerodynamic panel. Two rows of connecting elements, positioned on either side of the active portion, are provided to connect the base of the vortex generator and the aerodynamic panel.

According to this embodiment, as the aerodynamic panel has a curved profile, the base of the vortex generator must also be curved in order to follow the shape of the outer surface of the aerodynamic panel, which makes the method for manufacturing the vortex generator complex. According to another drawback, the base of the vortex generator has a rim, protruding relative to the outer surface of the aerodynamic panel, which disturbs the air stream and generates parasitic drag.

In order to overcome this drawback, FR3081830 describes a vortex generator as illustrated in FIGS. 3 and 4. According this second embodiment, the vortex generator 18 comprises:
 an active portion 20, protruding relative to the outer surface 16.1 of the aerodynamic panel 16, that has an extension 20.1 protruding relative to the inner surface 16.2 of the aerodynamic panel 16,
 a first angle section 22 that has a first arm 22.1, pressed against a first face of the extension 20.1, and a second arm 22.2 pressed against the inner surface 16.2 of the aerodynamic panel 16.
a second angle section 24 that has a first arm 24.1, pressed against a second face of the extension 20.1, and a second arm 24.2 pressed against the inner surface 16.2 of the aerodynamic panel 16.

In order to connect the vortex generator 18 and the aerodynamic panel 16, the aircraft comprises:
 a first series of connecting elements 26 connecting the first arms 22.1, 24.1 of the first and second angle sections 22, 24 and the extension 20.1,
 a second series of connecting elements 28 connecting the second arm 22.2 of the first angle section 24 and the aerodynamic panel 16,
 a third series of connecting elements 28' connecting the second arm 24.2 of the second angle section 24 and the aerodynamic panel 16.

According to one procedure, a method for mounting such a vortex generator 18 comprises a step of making a cut-out passing through the aerodynamic panel 16 to receive a portion of the active portion 20, a step of inserting the extension 20.1 of the active portion 20 into the cut-out previously made from the outer face 16.1 of the aerodynamic panel 16, a step of assembling the first and second angle sections 22, 24 by connecting them to the extension 20.1 by means of the first series of connecting elements 26, which pass through the first arms 22.1, 24.1 of the first and second angle sections 22, 24 and the extension 20.1, and finally a step of assembling the two arms 22.2, 24.2 of the first and second angle sections 22, 24 by pressing them against the inner surface 16.2 of the aerodynamic panel 16 and connecting them to the aerodynamic panel by means of the second and third series of connecting elements 28, 28', which pass through the second arms 22.2, 24.2 and the aerodynamic panel 16. The connecting elements 28, 28' of the second and third series have countersunk heads received in beveled recesses provided on the outer surface 16.1 of the aerodynamic panel 16.

As the aerodynamic panel 16 is curved, the first and second arms of each of the first and second angle sections 22, 24 are not perpendicular to each other. The second arm 22.2, 24.2 of each of the first and second angle sections 22, 24 is curved so that it can be pressed against the inner surface 16.2 of the aerodynamic panel 16.

This second embodiment is unsatisfactory as the methods for manufacturing and mounting the vortex generator 18 are relatively complex due to the curvature of the second arms 22.2, 24.2 of the first and second angle sections 22, 24 of the vortex generator 18 and the number of parts to be assembled.

The present invention aims to overcome all or some of the drawbacks of the prior art.

SUMMARY OF THE INVENTION

To this end, the invention relates to a method for mounting a vortex generator on an aerodynamic panel of an aircraft having outer and inner surfaces, at least the inner surface being curved, the vortex generator comprising an active portion and a base, said base comprising at least one arm substantially perpendicular to the active portion, said arm having a substantially flat upper face oriented towards the aerodynamic panel during operation, the mounting method comprising a step of making a cut-out passing through the aerodynamic panel and configured to receive a portion of the active portion of the vortex generator, a step of manufacturing the vortex generator in one piece and a step of assembling the vortex generator and the aerodynamic panel with connecting elements.

According to the invention, mounting method comprises, before the assembly step, a step of installing at least one shim interposed between the base and the aerodynamic panel, said shim comprising a first face, oriented towards the aerodynamic panel during operation, that is shaped like the inner surface of the aerodynamic panel, and a second face, oriented towards the base during operation, that is shaped like the upper face of the arm of the base.

Due to the presence of the shim, it is possible to manufacture the vortex generator independently of the curved profile of the aerodynamic panel, which makes it possible to make the vortex generator simpler to manufacture. The shim makes it possible to adapt the profile of the base of the vortex generator to the curvature of the aerodynamic panel and to obtain a more stable connection between the vortex generator and the aerodynamic panel.

According to another feature, the step of installing at least one shim consists of positioning the shim against the upper face of each arm of the base before a step of inserting the active portion of the vortex generator into the cut-out from the inner surface of the aerodynamic panel.

According to another feature, the mounting method comprises a step of applying a bead of sealant in the cut-out around the active portion of the vortex generator.

According to another feature, the base comprises first and second arms extending on either side of the active portion. In addition, the shim comprises a through-hole configured to partially receive the active portion.

According to another feature, the shim fully covers the upper faces of the first and second arms of the base.

The invention also relates to an aircraft comprising at least one vortex generator mounted using the mounting method according to one of the preceding features, the aircraft comprising an aerodynamic panel having outer and inner surfaces, at least the inner surface being curved, the vortex generator comprising an active portion and a base, said base comprising at least one arm substantially perpendicular to said active portion, said arm having a substantially flat upper face oriented towards the aerodynamic panel during operation, the aircraft comprising connecting elements connecting the vortex generator and the aerodynamic panel.

According to the invention, the aircraft comprises at least one shim interposed between the base and the aerodynamic panel, said shim comprising a first face, oriented towards the aerodynamic panel, that is shaped like the inner surface of the aerodynamic panel, and a second face, oriented towards the base, that is shaped like the upper face of the arm of the base.

According to another feature, the base comprises first and second arms extending on either side of the active portion. In addition, the shim comprises a through-hole configured to partially receive the active portion.

According to another feature, the shim fully covers the upper faces of the first and second arms of the base.

BRIEF DESCRIPTION OF THE DRAWINGS

Further features and advantages will become apparent on reading the following description of the invention, given by way of example only, with reference to the appended drawings, in which.

DETAILED DESCRIPTION OF THE PREFERRED EMBODIMENTS

Figure 1:
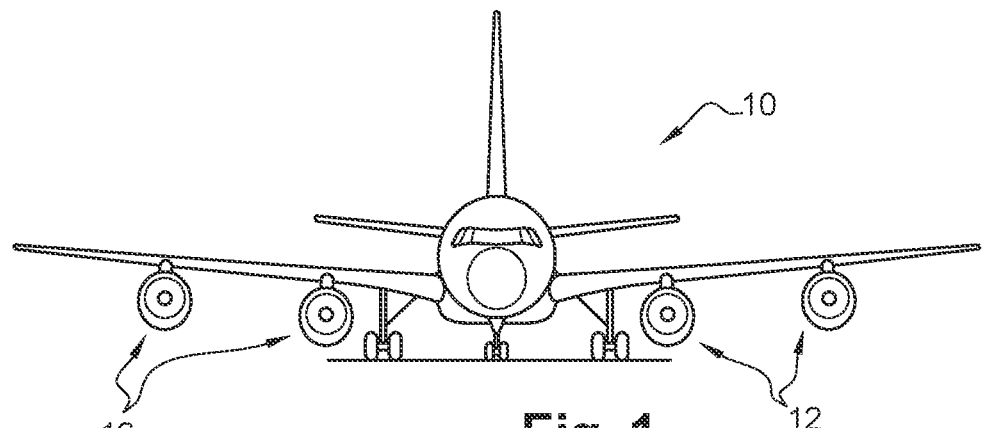
FIG. 1 is a front view of an aircraft.
Figure 2:
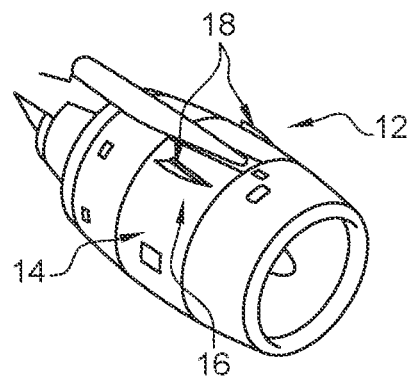
FIG. 2 is a perspective view of a powerplant comprising vortex generators.
Figure 3:
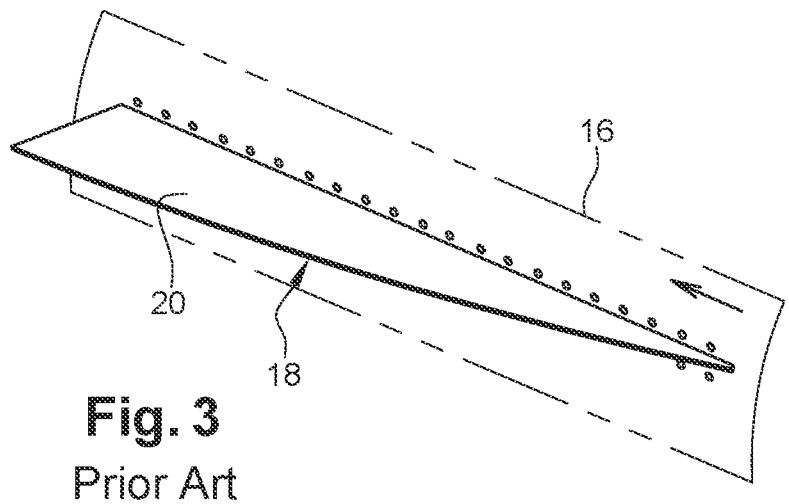
FIG. 3 is a perspective view of an aerodynamic panel provided with a vortex generator, illustrating an embodiment of the prior art.
Figure 4:
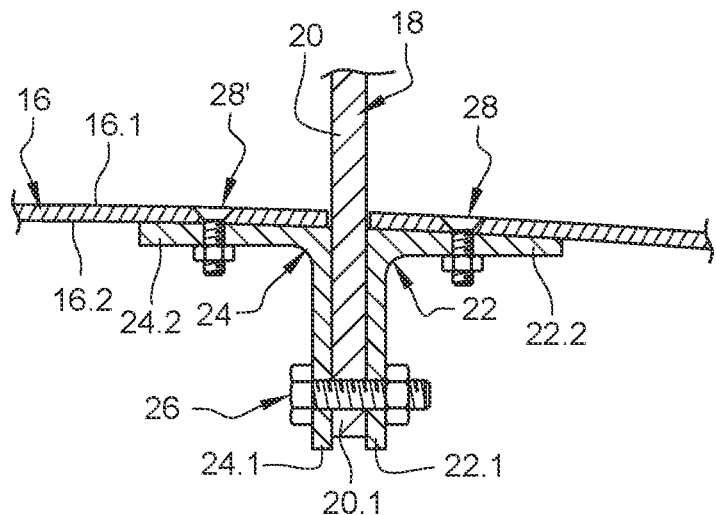
FIG. 4 is a transverse cross-section of the aerodynamic panel and a portion of the vortex generator visible in FIG. 3.
Figure 5:
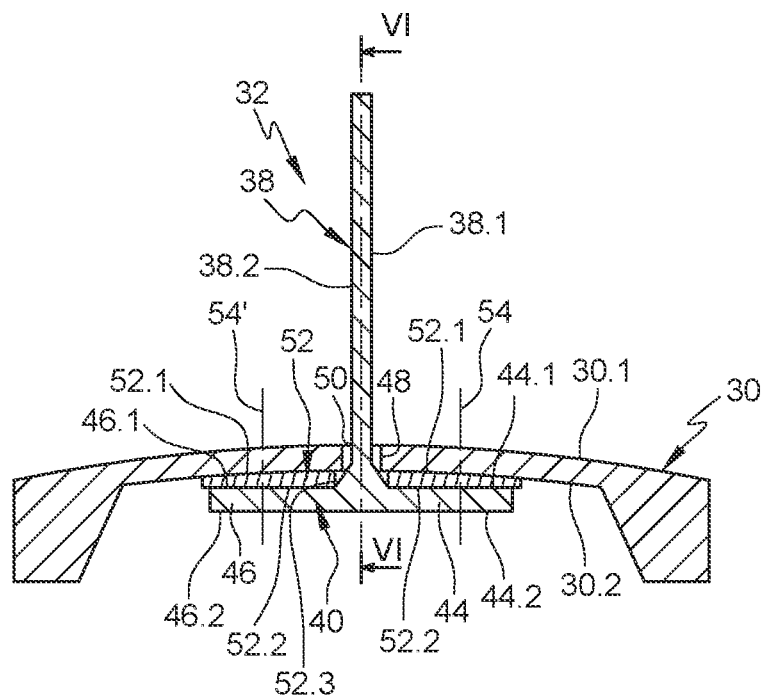
FIG. 5 is a transverse cross-section of an aerodynamic panel and a vortex generator, illustrating an embodiment of the invention.
Figure 6:
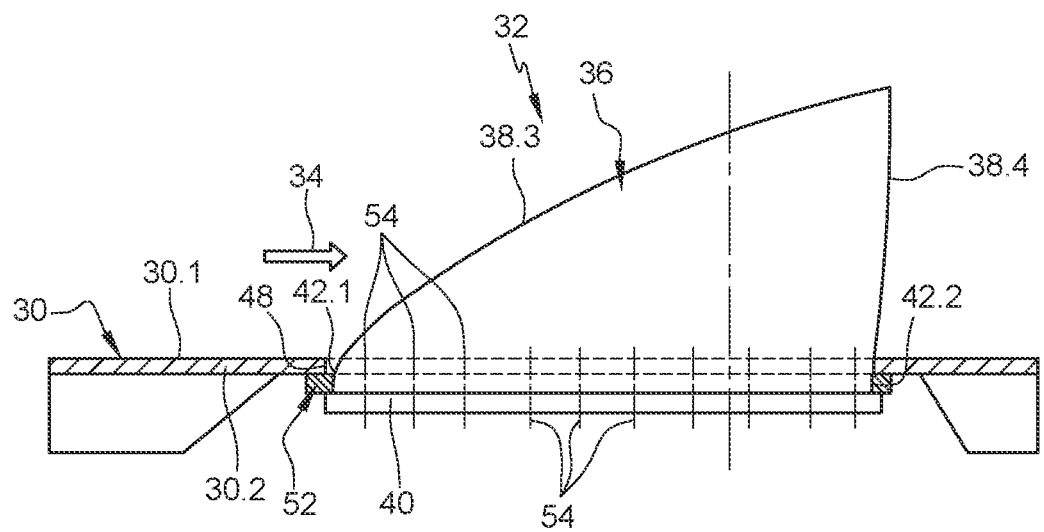
FIG. 6 is a cross-section along the line VI-VI in FIG. 5 of the aerodynamic panel and the vortex generator visible in FIG. 5, and FIGS. 7A and 7B are a perspective view of an aerodynamic panel and a vortex generator in a dismantled state FIG. 7A and a mounted state in FIG. 7B.

According to one embodiment that can be seen in FIGS. 5 and 6, an aircraft comprises at least one aerodynamic panel 30 and at least one vortex generator 32. According to one application, the aerodynamic panel 30 corresponds to the outer wall of a nacelle of a powerplant of an aircraft. Of course, the invention is not limited to this application.

The aerodynamic panel 30 comprises an outer surface 30.1 against which flows an air stream 34, in particular when the aircraft is in flight, together with an inner surface 30.2 on the opposite side from the outer surface 30.1. According to one configuration, the aerodynamic panel 30 comprises a thickness (distance separating the outer and inner surfaces 30.1, 30.2) that is substantially constant at least in the area in which the vortex generator 32 is provided.

The aerodynamic panel 30 comprises at least one curvature in a plane referred to as the transverse plane.

In the remainder of the description, the notions "upstream" and "downstream" refer to the direction of flow of the air stream 34, which flows from upstream to downstream.

The vortex generator 32 has a T-shaped transverse cross-section and comprises an active portion 38 (corresponding to the upright of the T) and a base 40 (corresponding to the crossbar of the T). The vortex generator 32 is made in one piece and extends between upstream and downstream ends 42.1, 42.2. Making the vortex generator 32 in one piece makes it possible to reduce the number of parts to be assembled when it is mounted.

The active portion 38 has two lateral faces 38.1, 38.2 substantially parallel to each other, at least one leading edge 38.3 that extends from the upstream end 42.1 and moves away from the base 40 as it moves away from the upstream end 42.1, and a trailing edge 38.4 positioned in line with the downstream end 42.4 that extends in a direction approximately perpendicular to the base 40. The leading edge 38.3 can be directly connected to the trailing edge 38.4 or connected thereto by means of a curved intermediate edge. Depending on the configuration, the leading edge 38.3 can be straight or curved.

The active portion 38 has a substantially constant thickness (distance separating the lateral faces 38.1, 38.2).

Of course, the invention is not limited to this configuration of the active portion 38. Regardless of the configuration, the active portion 38 has a given thickness and a given length (corresponding to the greatest distance between the leading and trailing edges 38.3, 38.4).

The base 40 has first and second flat arms 44, 46, which extend on either side of the active portion 38, positioned in a single plane and substantially perpendicular to the active portion 38.

Each of the first and second arms 44, 46 comprises a flat upper face 44.1, 46.1, oriented towards the inner surface 30.2 of the aerodynamic panel 30 during operation, and a lower face 44.2, 46.2 on the opposite side from the upper face 44.1, 46.1. Generally, this lower face 44.2, 46.2 is also substantially flat.

Providing first and second arms 44, 46 perpendicular to the active portion 38 with flat upper faces 44.1, 46.1 makes it possible to simplify the method for manufacturing the vortex generator 32.

According to one configuration, each of the first and second arms 44, 46 is substantially rectangular.

In order to make it possible to install the vortex generator 32, the aerodynamic panel comprises a cut-out 48 passing through it and emerging on the outer and inner surfaces 30.1, 30.2, and having a length substantially equal to or very slightly greater than the length of the active portion 38 and a width substantially equal to or very slightly greater than the thickness of the active portion 38.

During operation, the active portion 38 is partially received in the cut-out 48 in the aerodynamic panel 30 and the base 40 is pressed against the inner surface 30.2 of the aerodynamic panel 30. This arrangement makes it possible to limit the occurrence of parasitic drag.

Once the vortex generator 32 has been installed, there may be play between the active portion 38 and the aerodynamic panel 30. In this case, the aircraft comprises at least one bead of sealant 50 to compensate for this play in order to limit the occurrence of parasitic drag. This bead of sealant 50 comprises a surface flush with the outer surface 30.1 of the aerodynamic panel 30.

According to a particular feature of the invention, the aircraft comprises at least one shim 52 interposed between the aerodynamic panel 30 and the base 40 of the vortex generator 32.

This shim 52 has a first face 52.1, oriented towards the aerodynamic panel 30 during operation, that has a curvature adapted to the curvature of the inner surface 30.2 of the aerodynamic panel 30 in order to follow said inner surface 30.2, and a second face 52.2, oriented towards the base 40 during operation, that is substantially flat and shaped like the upper face 44.1, 46.1 of the first and second arms 44, 46 of the base 40.

When the vortex generator 32 is connected to the aerodynamic panel 30, optimum surface contact is thus obtained between the shim 52 and the aerodynamic panel 30 and between the shim 52 and the base 40 of the vortex generator 32.

The shim 52 comprises a through-hole 52.3 configured to partially receive the active portion 38.

According to one arrangement, the shim 52 fully covers the upper faces 44.1, 46.1 of the first and second arms 44, 46 of the base 40.

The aircraft can comprise a single shim or a plurality of shims. Of course, a low number of shims makes it possible to reduce the number of parts to be assembled.

According to a first embodiment, the shim 52 is produced by machining or additive manufacturing depending on the desired geometry with respect to the first and second faces 52.1, 52.2. It is rigid when it is installed.

According to a second embodiment, the shim 52 is made from a more or less paste-like product, interposed between the aerodynamic panel 30 and the base 40 of the vortex generator 32, that follows the shapes thereof. Once cured, the shim thus has a first face 52.1 shaped like the inner surface 30.2 of the aerodynamic panel 30 and a second face 52.2 shaped like the upper faces 44.1, 46.1 of the first and second arms 44, 46 of the base 40 of the vortex generator 32.

The aircraft comprises connecting elements 54 configured to connect the vortex generator 32 and the aerodynamic panel 30.

Each of these connecting elements 54 comprises a rod configured to pass through the first or second arm 44, 46 of the base 40 of the vortex generator 32, the shim 52 and the aerodynamic panel 30, and comprises a first head configured to rest against the aerodynamic panel and a second head configured to rest against the base.

According to one embodiment, the first head is flush with the outer surface 30.1 of the aerodynamic panel 30. According to one configuration, the first head is a countersunk head. In addition, the aerodynamic panel 30 comprises, for each connecting element 54, a beveled recess configured to receive the first head.

According to one arrangement, the aircraft comprises two series of connecting elements 54, 54' positioned on either side of the active portion 38, a first series of connecting elements 54 connecting the first arm 44 of the base 40 of the vortex generator 32 and the aerodynamic panel 30, and a second series of connecting elements 54' connecting the second arm 46 of the base 40 of the vortex generator 32 and the aerodynamic panel 30.

For each of the connecting elements 54, 54', the base 40 and the shim 52 each comprise a through-hole.

Figures 7A, 7B:
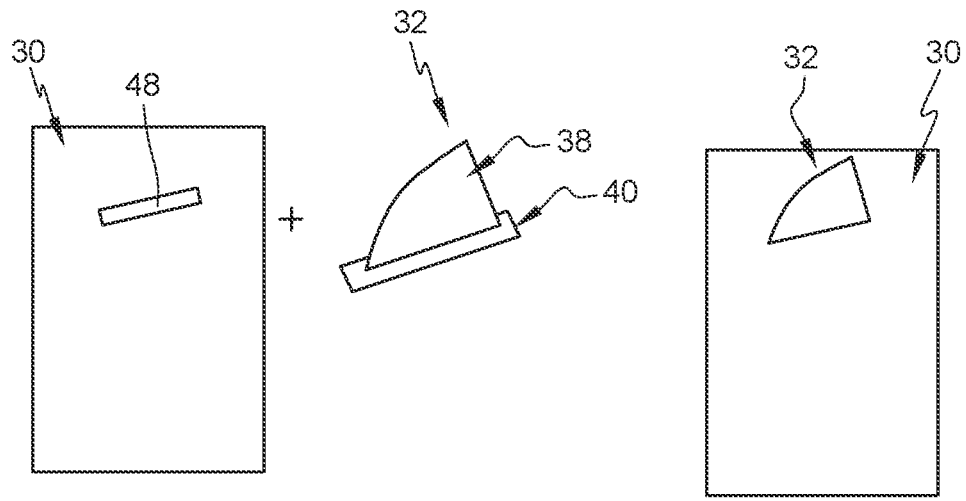

As illustrated in FIGS. 7A and 7B, a method for mounting a vortex generator 32 comprises a step of making a cut-out 48, passing through the aerodynamic panel 30, configured to receive the active portion 38 of a vortex generator 32, and a step of manufacturing a vortex generator 32 that has a T-shaped cross-section and comprises an active portion 38 and a base 40 made in one piece. This vortex generator 32 has a profile that is independent of the curvature of the aerodynamic panel 30.

The mounting method comprises a step of installing at least one shim 52 around the active portion 38, in contact with the upper faces 44.1, 46.1 of the first and second arms 44, 46 of the base 40. The shim 52 has a first face 52.1, oriented towards the aerodynamic panel 30 during operation, that is shaped like the inner surface 30.2 of the aerodynamic panel 30, and a second face 52.2, oriented towards the base 40, that is shaped like the upper face 44.1, 46.1 of the first and second arms 44, 46 of the base 40.

The mounting method comprises a step of inserting the active portion 38 of the vortex generator 32 into the cut-out 48 in the aerodynamic panel 30, from the inner surface 30.2 of the aerodynamic panel 30, until the shim 52 is in contact with the inner surface 30.2 of the aerodynamic panel 30.

As a variant, the mounting method comprises a step of installing the shim 52 against the inner surface 30.2 of the aerodynamic panel 30 and then a step of inserting the active portion 38 of the vortex generator 32 into the through-hole 52.3 in the shim 52 and then into the cut-out 48.

Regardless of the procedure, the mounting method comprises a step of installing at least one shim 52 between the aerodynamic panel 30 and the base 40 of the vortex generator 32.

The mounting method comprises a step of assembling the vortex generator 32 and the aerodynamic panel 30 by connecting them with connecting elements 54, 54'.

Finally, if necessary, the mounting method comprises a step of applying a bead of sealant 50 in the cut-out 48 around the active portion 38 of the vortex generator 32 in order to limit undesirable aerodynamic disturbance.

According to the invention, the base 40 of the vortex generator 32 no longer protrudes relative to the outer surface 30.1 of the aerodynamic panel 30. As a result, it does not generate undesirable aerodynamic disturbance.

Manufacturing the vortex generator 32 without taking into account the curvature of the aerodynamic panel 30 makes it possible to simplify the manufacturing thereof.

Producing the active portion 38 and the base 40 in one piece makes it possible to reduce the number of parts to be assembled.

Finally, the presence of the shim 52 makes it possible to adapt the profile of the base 40 of the vortex generator 32 to the curvature of the aerodynamic panel 30 and to obtain a more stable connection between the vortex generator 32 and the aerodynamic panel 30.

Of course, the invention is not limited to the embodiment described above. The base 40 can thus comprise just one arm 44.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for mounting a vortex generator on an aerodynamic panel of an aircraft having outer and inner surfaces, at least the inner surface being curved, the vortex generator comprising an active portion and a base, said base comprising at least one arm substantially perpendicular to the active portion, said arm having a substantially flat upper face oriented towards the aerodynamic panel during operation, the mounting method comprising the steps of:
    making a cut-out passing through the aerodynamic panel of the aircraft and configured to receive a portion of the active portion of the vortex generator,
    manufacturing the vortex generator in one piece,
    installing at least one shim interposed between the base and the aerodynamic panel of the aircraft, said shim comprising a first face, oriented towards the aerodynamic panel during operation, that is shaped like the inner surface of the aerodynamic panel, and a second face, oriented towards the base during operation, that is shaped like the upper face of the at least one arm of the base, and then
    assembling the vortex generator and the aerodynamic panel with connecting elements.

2. The mounting method as claimed in claim 1,
    wherein the base comprises first and second arms extending on either side of the active portion, and
    wherein the shim comprises a through-hole configured to partially receive the active portion.

3. The mounting method as claimed in claim 2, wherein the shim fully covers the upper faces of the first and second arms of the base.

4. The mounting method as claimed in claim 2, wherein the connecting elements comprises:
    a rod configured to pass through the first arm or the second arm of the base of the vortex generator, the shim and the aerodynamic panel,
    a first head configured to rest against the aerodynamic panel, and
    a second head configured to rest against the base.

5. An aircraft comprising:
    at least one vortex generator mounted using the mounting method as claimed in claim 1,
    an aerodynamic panel having outer and inner surfaces, at least the inner surface being curved,
        the vortex generator comprising an active portion and a base, said base comprising at least one arm substantially perpendicular to the active portion, said arm having a substantially flat upper face oriented towards the aerodynamic panel during operation,
    connecting elements connecting the vortex generator and the aerodynamic panel, and
    at least one shim interposed between the base and the aerodynamic panel, said shim comprising a first face, oriented towards the aerodynamic panel, that is shaped like the inner surface of the aerodynamic panel, and a second face, oriented towards the base, that is shaped like the upper face of the arm of the base.

6. The aircraft as claimed in claim 5,
    wherein the base comprises first and second arms extending on either side of the active portion, and
    wherein the shim comprises a through-hole configured to partially receive the active portion.

7. The aircraft as claimed in claim 6, wherein the shim fully covers the upper faces of the first and second arms of the base.

8. The mounting method as claimed in claim 1, wherein the step of installing at least one shim comprises positioning the shim against the upper face of each arm of the base before a step of inserting the active portion of the vortex generator into the cut-out from the inner surface of the aerodynamic panel.

9. The mounting method as claimed in claim 1, further comprising a step of applying a bead of sealant in the cut-out around the active portion of the vortex generator.

10. The mounting method as claimed in claim 1, wherein the vortex generator is T-shaped.

11. The mounting method as claimed in claim 1, wherein the connecting elements extend through the base of the vortex generator, the at least one shim, and the aerodynamic panel.

* * * * *